United States Patent [19]

Batchelor et al.

[11] Patent Number: 4,901,598
[45] Date of Patent: Feb. 20, 1990

[54] VEHICLE DRIVE-TRAIN TRANSFER CASE

[75] Inventors: Robert B. Batchelor, Birmingham; Gerald P. Hentschel, St. Clair Shores, both of Mich.

[73] Assignee: Chrysler Motors Corporation, Highland Park, Mich.

[21] Appl. No.: 802,670

[22] Filed: Nov. 29, 1985

[51] Int. Cl.$^4$ ............................................. F16H 37/06
[52] U.S. Cl. ................................. 74/665 GA; 180/247
[58] Field of Search ..................... 74/665 GA, 373; 180/245, 246, 247

[56] References Cited

U.S. PATENT DOCUMENTS

| | | | |
|---|---|---|---|
| 2,449,546 | 9/1948 | Buckendale et al. | 74/665 GA |
| 3,046,813 | 7/1962 | Bixby | 74/665 GA |
| 3,083,790 | 4/1963 | McAfee et al. | 74/665 GA |
| 4,270,409 | 6/1981 | Glaze et al. | 74/665 GA |
| 4,290,318 | 9/1981 | Ookubo et al. | 74/665 GA X |
| 4,292,860 | 10/1981 | Kako et al. | 74/665 GA |
| 4,559,846 | 12/1985 | Cochran et al. | 180/247 X |
| 4,560,025 | 12/1985 | Suzuki et al. | 180/247 |
| 4,609,064 | 9/1986 | Suzuki et al. | 180/247 X |

Primary Examiner—Dirk Wright
Attorney, Agent, or Firm—Brooks & Kushman

[57] ABSTRACT

A transfer case for selectively providing four-wheel drive for a motor vehicle comprises a first clutch for shifting the input torque to and between a high speed power path, a low speed power path and a neutral position, as well as a second clutch for selectively engaging first and second output shafts for connection with the low and high speed power paths. Each clutch includes a slidable collar which is aligned with and slidable along the axis of the input shaft of the transfer case. Preferably, a single selector is used to shift the first and second clutch collars to provide the transfer case with four operating modes: a neutral position in which the input shaft is disengaged from the first and second output shafts, a two-wheel drive high speed output, a four-wheel drive high speed output and a four wheel drive low speed output.

11 Claims, 3 Drawing Sheets

VEHICLE DRIVE-TRAIN TRANSFER CASE

BACKGROUND OF THE INVENTION

1. Field of the Present Invention

The present invention relates generally to a torque transfer mechanism having plural outputs, and more particularly to an adjustment mechanism for controlling the actuation and the speeds of each output.

2. Description of the Prior Art

The application of power from a vehicle engine to the wheels of more than one axle set in a motor vehicle is accomplished by coupling a transfer case to the output of the vehicle transmission. An input shaft of the transfer case is coupled to the output shaft of the transmission and is selectively connected through power paths formed by gear mechanisms to at least one of two output shafts. Each output shaft is coupled to a respective axle driving mechanism. It has also been known to provide a plurality of power paths through which the torque from the input shaft can be split or modified as desired before it is applied to any of the output shafts of the transfer case.

In previously known transfer cases, it has been common to incorporate constant mesh gearing. In such devices, clutch collars are shiftable for selective engagement with the gears of the desired power path. However, such clutches can increase the size of the transfer case, especially when the collar must be shifted a substantial distance in order to interconnect the input shaft with the various gear sets.

In addition, it has been known to interconnect the clutch collar so that a single operating means can shift more than one collar in order to actuate or adjust the speed of each output shaft. For example, U.S. Pat. No. 4,270,409 discloses a transfer case to be used in a four-wheel drive vehicle which provides both high speed and low speed power paths to the front and rear axles of a vehicle. The transfer case includes a pair of simultaneously shiftable clutch collars operated by means of a single shift fork. The clutch arrangement includes a high speed shift collar and a low speed shift collar. However, the low speed shift collar is slideable along an intermediate gear set having a driven gear which is in constant mesh with a drive gear secured for rotation with the input shaft. As a result, even though the low speed gear set is disengaged from the output shafts, the driven gear of the low speed path continues to operate. As a result, energy losses can be sustained in the low speed power path even though the transfer case is driving one or more of the axles at a high speed. Such movement of the driven gear can contribute to excessive wear on the parts and substantially increases the need for lubrication. Moreover, since the clutch collars are located in the same plane for simultaneous shifting along radially spaced axes, each clutch collar is subjected to greater off-axis moments during shifting than a shift collar or collars displaceable along a single axis.

SUMMARY OF THE PRESENT INVENTION

The present invention overcomes the above mentioned disadvantages by providing a transfer case with axially aligned clutches, wherein one clutch controls the actuation and speed of a first output shaft and a second axially aligned clutch controls the transfer of the torque from the first output shaft to the second output shaft. In the preferred embodiment of the present invention, the transfer case provides the motor vehicle with two wheel drive high gearing, a four-wheel drive high gearing and a four-wheel drive low gearing as well as a neutral setting.

In the preferred embodiment, the first output shaft is axially aligned with the input shaft, and each of the clutch mechanisms includes a shiftable clutch collar which is displaceable along the common axis of the input and first output shafts. Thus, a simple selector can be used to move the clutch collars even if the gear configuration requires the shifting of the collars in opposite directions. In addition, although the transfer case of the present invention employs an intermediates shaft for generating a low gear output at the output shafts in a four-wheel drive mode, the intermediate shaft and related gear components remain disengaged from the input shaft during two-wheel high speed operation in order to limit energy losses and lubrication requirements of the transfer mechanism. These and other advantages of the present invention will become more evident from the detailed description which follows.

BRIEF DESCRIPTION OF THE DRAWING

The present invention will be more clearly understood by reference to the following detailed description of a preferred embodiment when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
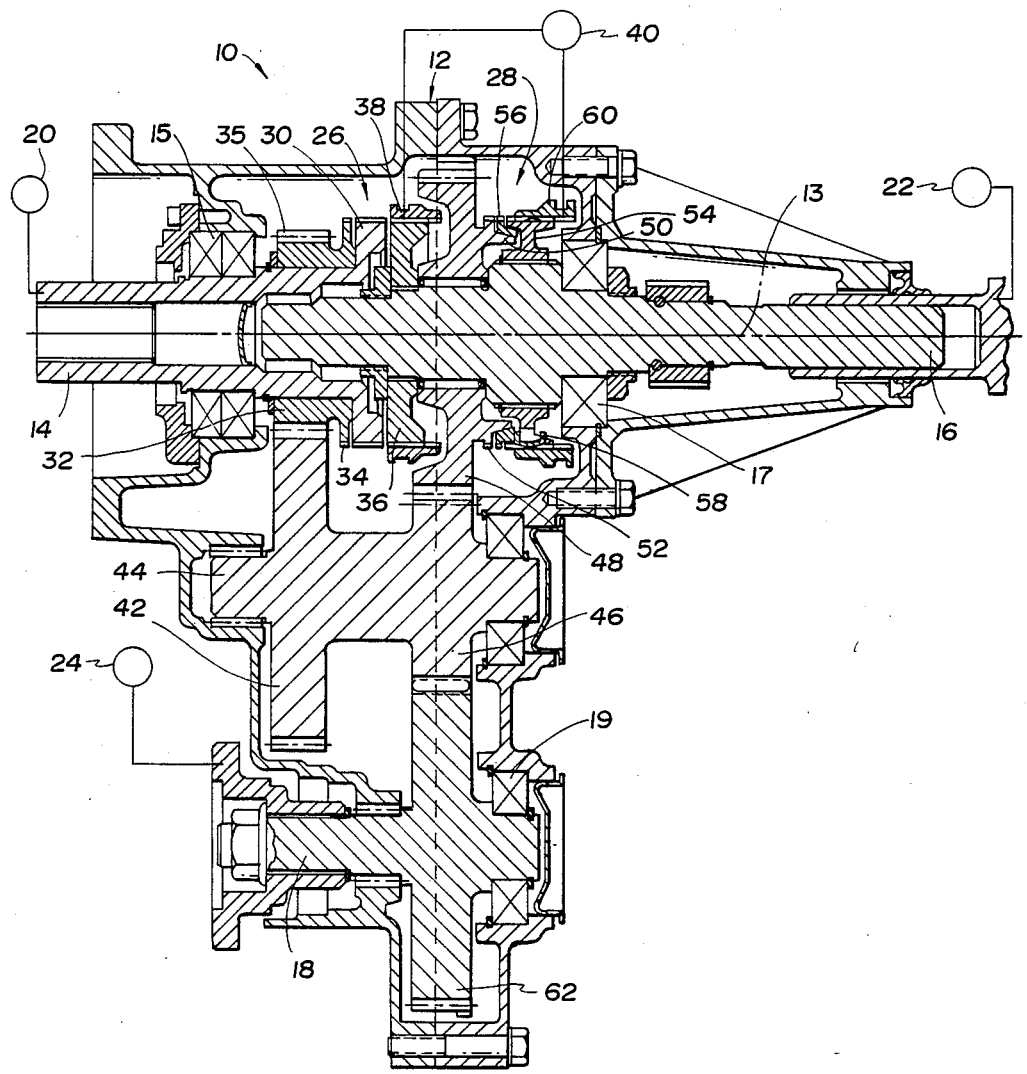
FIG. 1 is a sectional view of a transfer case according to the present invention.

Referring first to FIG. 1, a transfer case 10 according to the present invention is shown comprising a housing 12 adapted to rotatably support an input shaft 14, a first output shaft 16 axially aligned with the input shaft 14, and a second output shaft 18 radially spaced from the axis of the input shaft 14. For example, bearings 15, 17, and 19 rotatably support the shafts 14, 16 and 18 respectively. As is diagrammatically indicated in FIG. 1, the input shaft 14 is adapted to be connected to the output of the transmission 20, the first output shaft 16 is adapted to be connected to rear axle drive mechanism 22 and the second output shaft 18 is adapted to be connected to the front axle drive mechanism 24. As will be discussed in greater detail hereinafter, the transfer case 10 also includes a first clutch means 26 for selectively engaging a high gear path, a low gear path or a neutral position, and a second clutch means 28 for selectively engaging a single axle (two-wheel) drive or two axle (four-wheel) drive mode.

The input shaft 14 includes an input drive hub 30 having axially extending clutch teeth. A drive gear 32 is positioned axially adjacent to the input hub 30 and mounted for rotation about the input shaft 14. The drive gear 32 includes a clutch hub having a set of axially extending clutch teeth 34 radially aligned with the clutch teeth on the drive hub 30. A second driven clutch hub 36 axially adjacent the other side of the input hub 30 is coupled by splines or the like to the output shaft 16. A clutch collar 38 is slideable along the axis on the clutch teeth of the driven clutch hub 36, input hub 30 and drive gear 32 to selectively engage the driven hub and drive gear in response to actuation of the selector mechanism diagrammatically indicated at 40.

A set of helical gear teeth 35 on the drive gear 32 are constantly meshed with the teeth of a driven gear 42 formed on an intermediate shaft 44. Also mounted on the shaft 44 is an intermediate driven gear 46 axially spaced from the gear 42. Although the gears 42 and 46 can be separately formed and mounted to a separate shaft 44, the gears can be integrally formed with the shaft for convenience, strength and reliability, as shown in the drawing.

The teeth of the driven gear 46 are in constant mesh with a driveable gear 48. The drivable gear 48 is rotatably mounted about the output shaft 16 by a needle bearing adjacent to drive gear 36 so that, as shown in the drawing, the gear 48 is at an axial position intermediate the first and second clutches 26 and 28. The gear 48 includes an axially extended portion 50 forming a portion of the second clutch means 28. As shown in the drawing, the axially extended portion 50 of the gear 48 includes clutch teeth 52 aligned with the gear teeth of a driven hub 54 which is mounted by splines or the like on the first output shaft 16. As also shown in the drawing, synchronizer means such as the synchronizer ring 56 and the synchronizer engagement shoe 58 are also employed in the clutch means 28 of the preferred embodiment of the present invention. Nevertheless, it will be understood that other constructions of the clutch mechanism can be used so long as a clutch collar 60 is axially shifted along the axis 13 to selectively couple a gear on the first output shaft with a gear in the drive path for the second output shaft. For example, the extended portion 50 of gear 48 can be further elongated so that the collar 60 can be positioned thereon in a neutral position. Accordingly, the synchronizer ring can be associated with the driven hub 54, whereby the collar 60 is shifted in the opposite direction (i.e. to the right in FIG. 1) to drive both the first and second output shafts. In any event, gear 48 is freed from rotating with the output shaft 16 by the needle bearings unless the clutch collar 60 engages both the gear 48 and driven hub 54.

While the intermediate driven gear 46 is in constant mesh with the rotatable gear 48, it is also in constant mesh with a driven gear 62. The output gear 62 is mounted for rotation with the second output shaft 18, and as shown in the drawing, can be integrally formed therewith.

Since the clutch collars 38 and 60 are axially aligned, they can be conveniently shifted to a desired position by a single actuating member. For example, a selector means 40 can comprise a cam plate having first and second cam surfaces. A cam follower secured to each clutch collar 38 and 60 rides against the first and second cam surfaces, respectively, of the cam plate. Moreover, it is to be understood that the cam followers, and thus the clutch collars, can be moved in opposite directions with each actuation of selector means 40, for example, each displacement of the cam plate, depending upon the shape of the cam surfaces formed thereon. In any event, it is to be understood that axial alignment of the clutch collars 38 and 60 substantially reduces the complexity and bulk of the selector mechanism necessary to operate the first and second clutches insofar as the forces necessary for clutch actuation are aligned along the same axis. Moreover, as best shown in FIG. 1, an axial recess in the gear 48 receives the clutch collar 38 at one end of the collar's path of coaxial displacement to further reduce the axial distance between the gear set including intermediate gear 42 and the gear set including intermediate gear 46.

Having thus described the important structural features of the preferred embodiment of the present invention, the operation of the embodiment can be readily described. As shown in FIG. 1, the clutch collar 38 is shifted to engage only the drive hub 36 and is thus displaced from the input hub 30. As a result, in the position shown in FIG. 1, the first clutch means 26 is in a neutral position, whereby rotation of the input shaft 14 does not provide any output to the output shafts 16 or to the output shaft 18.

Figure 2:
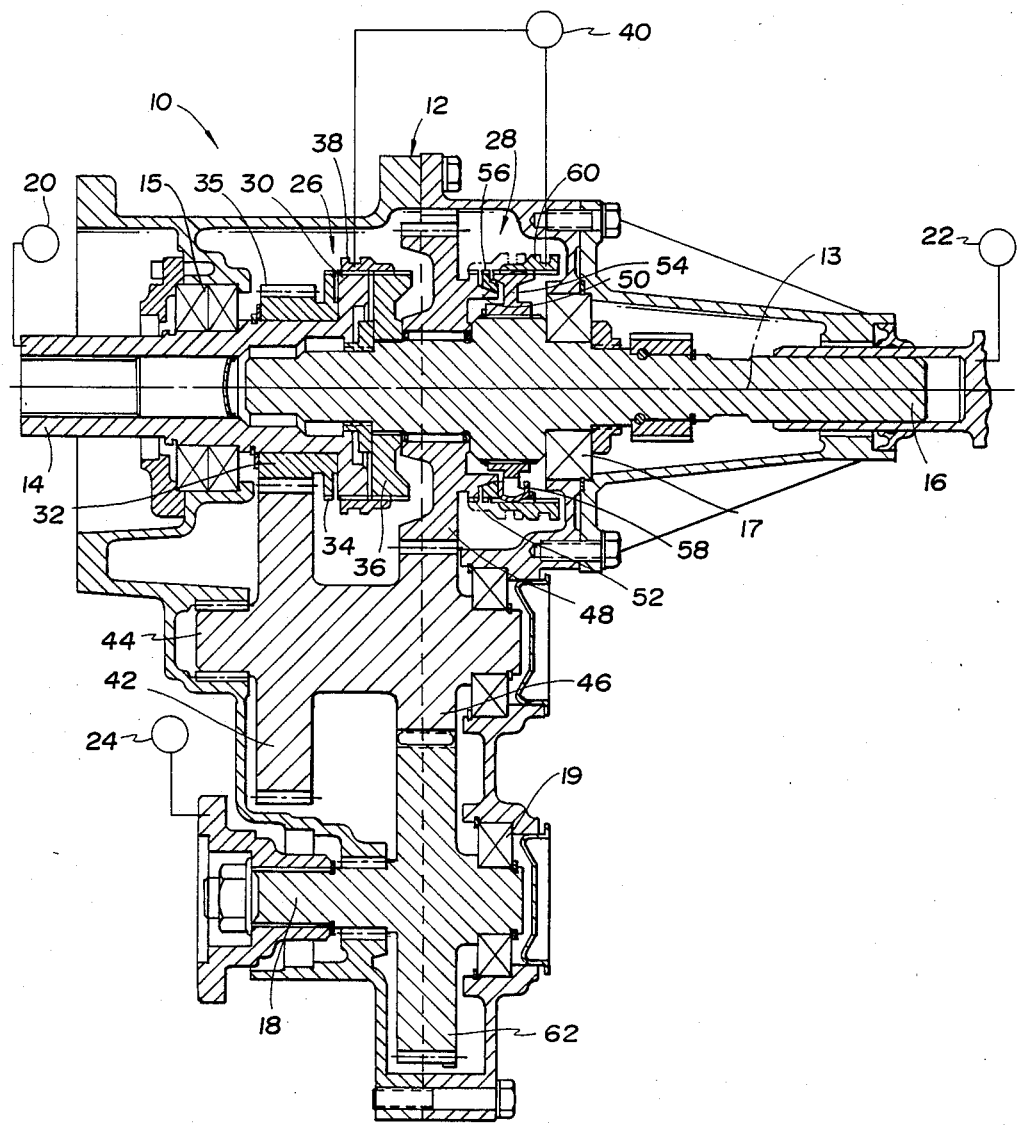
FIG. 2 is a sectional view similar to FIG. 1 but showing the components in a further operative position.

As shown in FIG. 2, the clutch collar 38 has been shifted to engage the clutch teeth of the input hub 30 as well as the drive hub 36. As a result, the drive hub 36 rotates with the input hub 30, and its spline connection with first output shaft 16 causes rotation of the output shaft 16 at the same speed as the input shaft 14. With the clutch collar 60 in the position shown in solid line in FIG. 2, the driven gear 48 is disengaged by the clutch means 28 so that the shaft 16 rotates within the needle bearing without causing rotation of the driven gear 48. As a result, the intermediate driven gear 46 and the output gear 62 remain stationary.

With the clutch collar 60 shifted to the position shown in phantom lines in FIG. 2, a power path extends through the driven gear 48, the intermediate gear 46 and the output gear 62, thus providing torque to the second output shaft 18. Consequently, it will be understood that both the output shaft 16 and the output shaft 18 are rotated in response to rotation of the input shaft 14.

Figure 3:
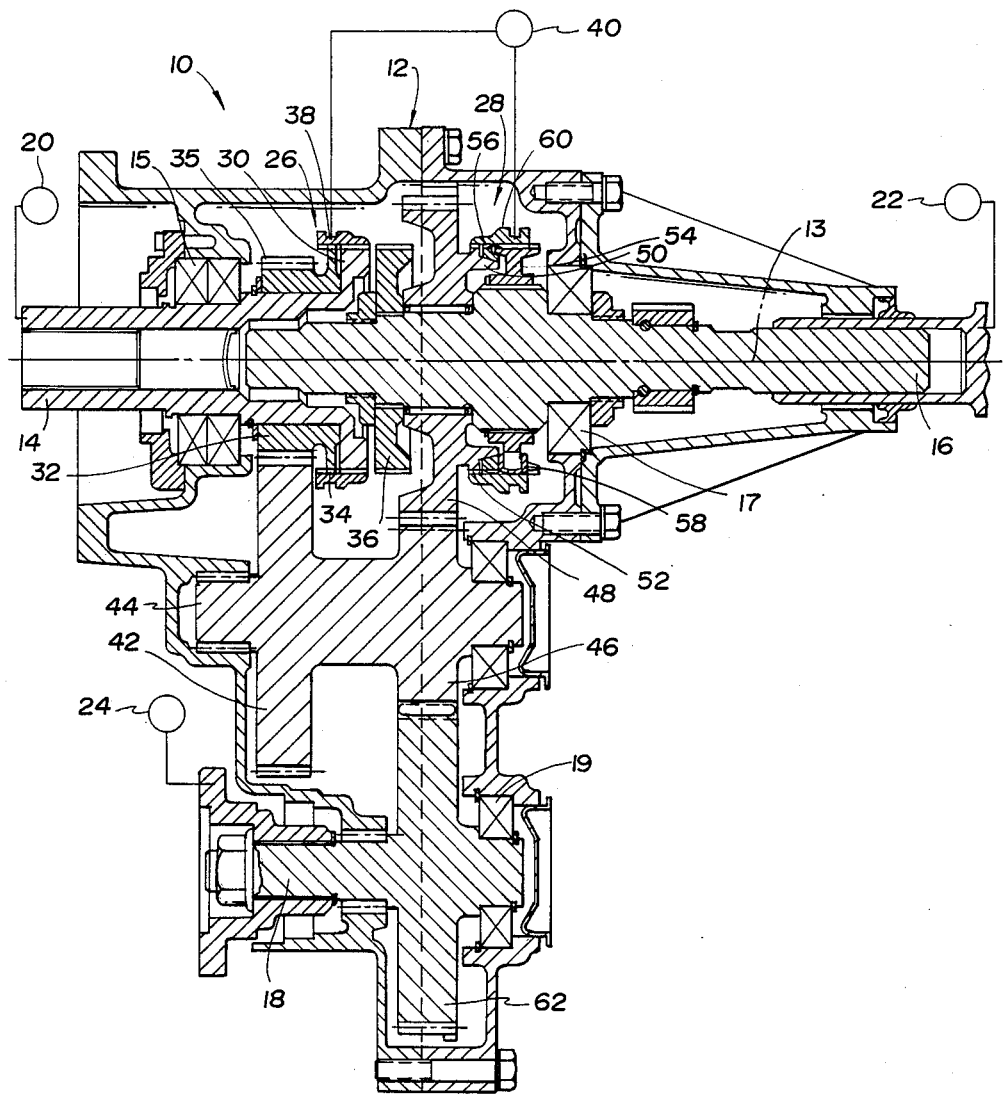
FIG. 3 is a sectional view similar to FIGS. 1 and 2 but showing the components in a further operative position.

Referring now to FIG. 3, the clutch, 38 is shown engaged with the clutch teeth of the input hub 30 and the clutch teeth 34 of the drive gear 32. At the same time, the clutch collar 38 is disengaged from the high speed drive hub 36. As a result, the clutch means 26 actuates the low speed power path extending through drive gear 32 and intermediate driven gear 42 to the shaft 44. Likewise, rotation of the shaft 44 provides a power path through the intermediate driven gear 46 to the output gear 62 so that the output shaft 18 rotates at a slower speed than the input shaft 14 in a low gear mode. Likewise, the low gear power path extends through the driven gear 46 and the driven gear 48. With the clutch collar 60 in the position shown in solid line in FIG. 3, the second clutch means 28 connects the low speed power path to the first output shaft 16. It is preferable to restrict the clutch collar 60 to the position shown in solid line in FIG. 3 when the first clutch means 26 engages the low gear power path from the input shaft 14 so that excessive low gear torque cannot be applied to the drive mechanism of single axle such as the drive mechanism 24 attached to the second output shaft 18.

Having thus described the present invention, many modifications thereto will become apparent to those skilled in the art to which it pertains without departing from the scope and spirit of the present invention as defined in the appended claims.

What is claimed is:
1. A torque transfer apparatus comprising:
 an input shaft and first means for rotatably supporting said input shaft;
 a first output shaft and second means for rotatably supporting said first output shaft;

a second output shaft and third means for rotatably supporting said second output shaft;

low gear means for driving at least one of said first and second output shafts in response to rotation of said input shaft;

high gear means for driving at least one of said first and second output shafts in response to rotation of said input shaft;

first clutch means for selectively connecting one of said low gear means and said high gear means between said input shaft and at least one of said first and second output shafts;

second clutch means for selectively connecting one and both said first and second output shafts to at least one of said low gear means and said high gear means;

means for actuating each of said first and second clutch means comprising a clutch collar, and means for slideably supporting and shifting said clutch collar for coaxial displacement along the axis of said input shaft;

wherein said low gear means comprises an intermediate shaft radially spaced from said input shaft, a first driven gear supported for rotation by said intermediate shaft, a drive gear in constant mesh with said driven gear and rotatably supported about the axis of said input shaft, and means for selectively displacing said clutch collar of said first clutch means for engagement with said drive gear, whereby said intermediate shaft is disengaged from said input shaft when said collar is disengaged from said drive gear;

wherein said intermediate shaft includes a second intermediate driven gear axially spaced from said first driven gear;

wherein said first output shaft is axially aligned with said input shaft, and wherein said second output shaft is radially spaced from said input shaft; and a drivable gear rotatably and coaxially mounted about the axis of said first output shaft and in engagement with said second intermediate driven gear at a position axially disposed intermediate said first and second clutch means.

2. The invention as defined in claim 1 wherein said drivable gear includes an axially extended portion, a driven hub mounted for rotation with said first output shaft axially adjacent said extended portion of said gear; and wherein said second clutch means comprises means for selectively displacing said clutch collar for engagement with said axially extended portion of said gear and said driven hub.

3. The invention as defined in claim 1 wherein said input shaft comprises an input hub coaxially aligned with and axially spaced from said drive gear of said low gear means.

4. The invention as defined in claim 3 wherein said first output shaft is axially aligned with said input shaft and wherein said high gear means includes a driven clutch hub coaxial with and axially spaced from said input hub of said input shaft, and wherein said driven clutch hub is engaged with said first output shaft for rotation therewith.

5. The invention as defined in claim 4 wherein said driven clutch hub is axially positioned on the side of said input hub of said input shaft opposite to the side of the drive gear of said low gear means and wherein said clutch collar of said first clutch means is axially shorter than the axial length of said driven clutch hub and said input hub of said low gear means.

6. The invention as defined in claim 1 wherein said second clutch means comprises means for selectively connecting one and both of said first and second output shafts to said high gear means when said high gear means has been selected by said first clutch means, and for selectively connecting only both of said first and second output shafts to said low gear means when said low gear means has been selected by said first clutch means.

7. A torque transfer apparatus comprising:
an input shaft and first means for rotatably supporting said input shaft;
a first output shaft axially aligned with said input shaft and second means for rotatably supporting said first output shaft;
an intermediate shaft radially spaced from said input shaft and said first output shaft and means for rotatably supporting said intermediate shaft, said intermediate shaft having a first driven gear and a second driven gear secured for rotation therewith;
a second output shaft radially spaced from said intermediate shaft and fourth means for rotatably supporting said second output shaft;
first gear means for selectively driving said first driven gear in response to rotation of said input shaft;
second gear means engageable with said second driven gear for selectively driving said first and second output shafts in response to rotation of said first driven gear;
third gear means for selectively driving only said first output shaft when said first driven gear is selectively disengaged from rotation in response to rotation of said input shaft;
selector means for selectively actuating each of said first, second and third gear means;
wherein said selector means includes first clutch means for selecting one of drivingly engaging said input shaft with said first driven gear, drivingly engaging said input shaft with said first output shaft, and disengaging said input shaft from said first driven gear and said first output shaft;
second clutch means for selectively driving said second output shaft in response to rotation of said first output shaft; and
wherein said second gear means comprises a drivable gear rotatably mounted axially intermediate said first and second clutch means and in engagement with said second driven gear.

8. The invention as defined in claim 7 wherein each said first and second clutch means comprises an annular clutch collar and means for supporting and slideably shifting said collar in axial alignment with said input shaft.

9. The invention as defined in claim 7 wherein said selector means further comprises means for disengaging all of said first, second and third gear means, whereby said transfer case includes a neutral operating mode.

10. The invention as defined in claim 1 wherein said drivable gear includes an axial recess positioned to receive one of said clutch collars at one end of said clutch collar's path of coaxial displacement.

11. The invention as defined in claim 8 wherein said gear includes an axial recess positioned to receive one of said clutch collars at one end of said clutch collar[3 s path of axial displacement.

* * * * *